US010697421B2

(12) United States Patent
Mei et al.

(10) Patent No.: US 10,697,421 B2
(45) Date of Patent: Jun. 30, 2020

(54) INTEGRATED TURBOMACHINE WITH AN AXIAL LOCKING DEVICE

(71) Applicant: Nuovo Pignone Tecnologie Srl, Florence (IT)

(72) Inventors: Luciano Mei, Florence (IT); Massimo Camatti, Florence (IT); Manuele Bigi, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 353 days.

(21) Appl. No.: 15/562,903

(22) PCT Filed: Apr. 20, 2016

(86) PCT No.: PCT/EP2016/058808
§ 371 (c)(1),
(2) Date: Sep. 29, 2017

(87) PCT Pub. No.: WO2016/170012
PCT Pub. Date: Oct. 27, 2016

(65) Prior Publication Data
US 2018/0080430 A1 Mar. 22, 2018

(30) Foreign Application Priority Data

Apr. 21, 2015 (IT) ................. FI2015A0115

(51) Int. Cl.
*F03B 13/10* (2006.01)
*F04D 25/06* (2006.01)
(Continued)

(52) U.S. Cl.
CPC ................ *F03B 13/10* (2013.01); *F01D 3/04* (2013.01); *F01D 17/12* (2013.01); *F01D 25/16* (2013.01);
(Continued)

(58) Field of Classification Search
CPC . F03B 13/10; F01D 3/04; F01D 17/12; F01D 25/16; F04D 25/0686; F04D 29/051; F04D 29/058; F04D 29/624
See application file for complete search history.

(56) References Cited

U.S. PATENT DOCUMENTS 4,073,184 A * 2/1978 Collins .................. G01B 13/12
340/679
4,872,357 A 10/1989 Valliant De Guelis et al.
(Continued)

FOREIGN PATENT DOCUMENTS

| EP | 2 469 100 A1 | 6/2012 |
| WO | 2012/057885 A1 | 5/2012 |
| WO | 2014/042626 A1 | 3/2014 |

OTHER PUBLICATIONS

Italian Search Report and Written Opinion issued in connection with corresponding IT Application No. FI2015A000115 dated Dec. 14, 2015.
(Continued)

*Primary Examiner* — Emily P Pham
(74) *Attorney, Agent, or Firm* — Baker Hughes Patent Organization

(57) ABSTRACT

An integrated turbomachine is described, comprising: a casing; an electric motor and a driven turbomachine component housed in the casing; a rotating shaft drivingly connecting the electric motor and the driven turbomachine component; a thrust bearing and a radial bearing rotatingly supporting the shaft; an axial locking device housed inside the casing, for applying a thrust to the shaft, parallel to the rotation axis (A-A) of the shaft, and comprised of an actuator member, configured to selectively activate and/or deactivate the axial locking device.

19 Claims, 3 Drawing Sheets

(51) Int. Cl.
- *F04D 29/051* (2006.01)
- *F04D 29/058* (2006.01)
- *F04D 29/62* (2006.01)
- *F01D 17/12* (2006.01)
- *F01D 25/16* (2006.01)
- *F01D 3/04* (2006.01)

(52) U.S. Cl.
CPC ....... *F04D 25/0686* (2013.01); *F04D 29/051* (2013.01); *F04D 29/058* (2013.01); *F04D 29/624* (2013.01)

(56) References Cited

U.S. PATENT DOCUMENTS

| | | | | |
|---|---|---|---|---|
| 9,222,481 | B2* | 12/2015 | Alban | F04D 29/054 |
| 2013/0216351 | A1 | 8/2013 | Griffin | |
| 2013/0294939 | A1* | 11/2013 | Gilarranz | F04D 17/12 |
| | | | | 417/53 |
| 2015/0076972 | A1* | 3/2015 | Leiber | H02K 7/08 |
| | | | | 310/68 B |
| 2015/0275911 | A1* | 10/2015 | Carrasco | F04D 29/058 |
| | | | | 417/423.12 |
| 2015/0322756 | A1* | 11/2015 | Cunningham | F04D 25/026 |
| | | | | 417/53 |

OTHER PUBLICATIONS

International Search Report and Written Opinion issued in connection with corresponding PCT Application No. PCT/EP2016/058808 dated Jun. 21, 2016.

International Preliminary Report on Patentability issued in connection with corresponding PCT Application No. PCT/EP2016/058808 dated Oct. 24, 2017.

* cited by examiner

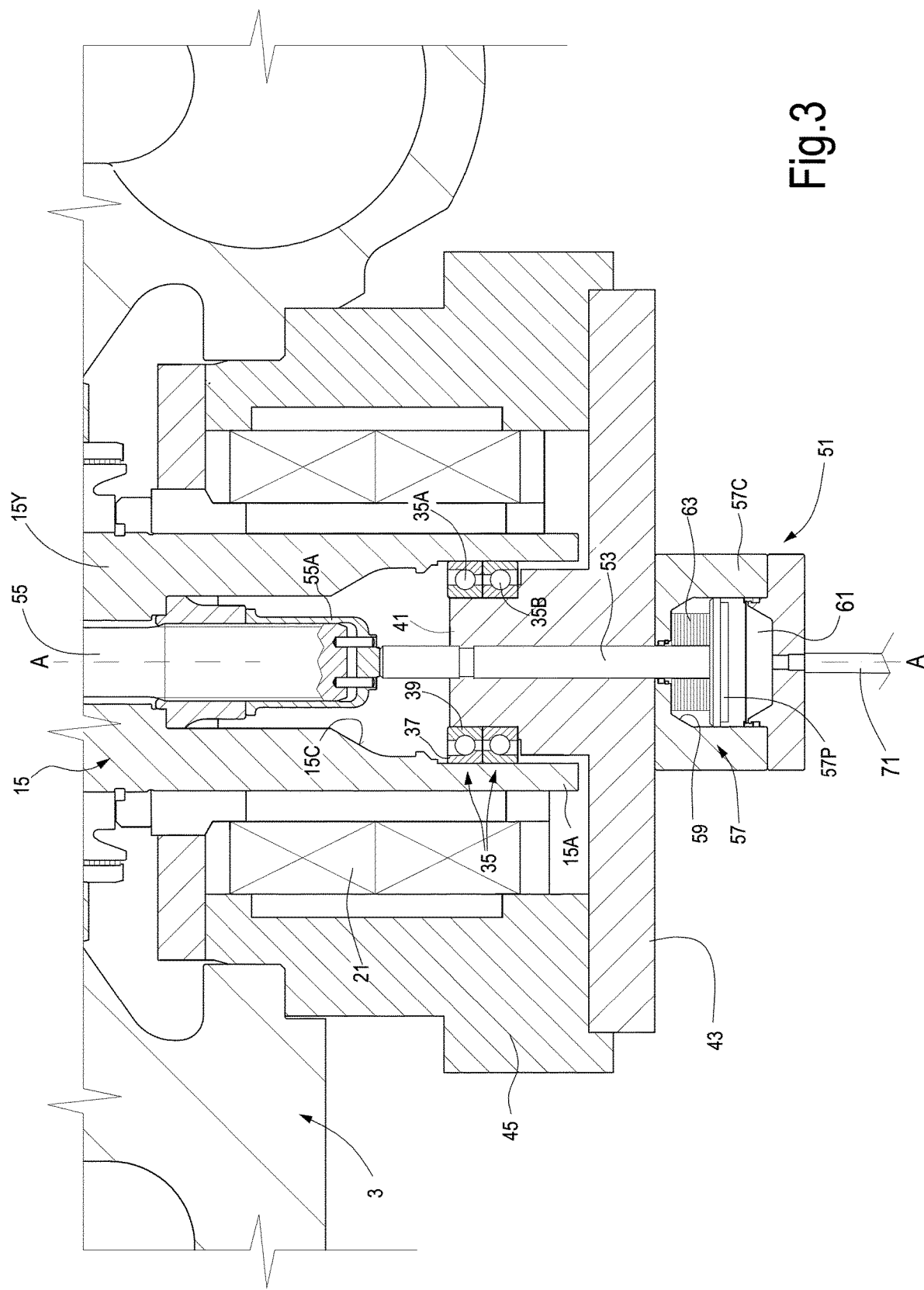

INTEGRATED TURBOMACHINE WITH AN AXIAL LOCKING DEVICE

FIELD OF THE INVENTION

The present disclosure relates to motor-compressor units, comprising an electric motor and a compressor driven by the electric motor, housed in a casing. Embodiments disclosed herein specifically relate to motor-compressor units for subsea applications. More specifically, embodiments disclosed herein relate to motor-compressor units comprising one or more magnetic bearings supporting the driving shaft, which connects the electric motor and the compressor.

BACKGROUND

Integrated turbomachines are rotary machines typically including a rotating equipment housed in an outer casing, or a plurality of casings. The rotating equipment includes a shaft which is rotatingly housed in the casing(s) and which usually does not project outside the casing(s). Once the integrated turbomachine is connected to the outer piping, the inner rotating shaft is inaccessible from outside the casing(s).

Typical integrated turbomachines are comprised of a motor, such as an electric motor, and a driven turbomachine, such as a centrifugal pump or a centrifugal compressor, both housed in one or more mutually connected outer casings.

Motor-compressor units are typical examples of integrated turbomachines. These units are usually comprised of an outer casing, which houses an electric motor and a compressor, connected to one another by a driving shaft. The shaft is rotatingly supported in the casing by a plurality of bearings. In some applications, specifically in subsea applications, the casing comprises a motor compartment, which houses the electric motor, and a compressor compartment, which houses the compressor. Both compartments are sealingly closed to prevent penetration of sea water. Some subsea motor-compressor units usually employ oil-lubricated bearings for supporting the driving shaft. Recently, magnetic bearings, or active magnetic bearings have been introduced in this kind of machinery, in order to avoid certain disadvantages deriving from the presence of lubricating oil in the casing.

Other integrated turbomachines include hydrodynamic, hydrostatic or hybrid (hydrostatic/hydrodynamic) bearings, using a fluid, either liquid or gaseous, to generate a force radially or axially supporting the rotating driving shaft.

Active magnetic bearings operate without mechanical friction, but require continuous supply of electrical power. In case of lack of electrical power supply or of any other defective operation of the active magnetic bearings, the shaft needs to be supported by so-called landing bearings, sometimes named also auxiliary bearing, emergency bearings or back-up bearings. The landing bearings support the shaft when the active magnetic bearings are inoperative, e.g. for lack of electric supply.

Landing bearings provide mechanical redundancy and need to be designed and dimensioned correctly so as to prevent damages to the machine in case of failure of the active magnetic bearings. Landing bearings shall also ensure immediate recover of the machine upon removal of the cause which determined the temporary failure of the active magnetic bearings.

A landing bearing consists of a high precision mechanical bearing which can be slightly preloaded in axial and radial directions. Rolling bearings are usually used as landing or auxiliary bearings in rotary machines provided with active magnetic bearings. Typically, angular ball bearings or deep groove ball bearings mounted in pair and which may be axially preloaded, are used. These landing bearings have both axial as well as radial load capacity.

Subsea motor-compressor units are designed for operation at great depth under seawater. They are usually installed on modules which are placed on the seafloor, several hundred meters under sea level. Even though the motor-compressor module is handled with care and submerged at low speed, an impact against the seafloor cannot be avoided. This can damage the landing bearings.

Similar problems may arise in other circumstances, whenever a turbomachine is potentially subject to shocks.

Axial locking devices are known, suitable for axially locking the rotor of a turbomachine, thus preventing damages of the bearings, being these latter magnetic, hydrodynamic, hydrostatic, hybrid or rolling bearings or combination thereof. These known axial locking devices require access to the inner rotating shaft of the turbomachine and are usually placed between a shaft end and a closure member, which temporarily closes an aperture of the casing. Once the turbomachine is mounted, e.g. on a subsea module, the cover is removed and piping is fluidly connected to the interior of the casing though the aperture. The axial locking device must be removed before the turbomachine is connected to the piping. Once the axial locking device has been removed, there is no protection of the machine bearings against accidental shocks anymore.

Arrangements would thus be desirable, aimed at preventing or reducing damages to bearings, such as for instance but not exclusively landing bearings, of turbomachines, e.g. integrated turbomachines, due to shocks caused by collisions or the like.

SUMMARY OF THE INVENTION

According to embodiments disclosed herein, an integrated turbomachine comprises a casing housing an electric motor and a driven turbomachine component. Within the context of the present disclosure and of the annexed claims, a casing can be formed by one or more casing components. A shaft, rotatingly supported in the casing by means of at least one radial bearing and one axial or thrust bearing, drivingly connects the electric motor and the driven turbomachine component. As typically provided in integrated turbomachines, the ends of the shaft are arranged within the casing and are not accessible from outside the casing. An axial locking device is further housed inside the casing, arranged and configured for applying a thrust to the shaft, in a direction parallel to the rotation axis thereof. The axial locking device is comprised of an actuator member, configured to selectively activate and/or deactivate the axial locking device.

The axial locking device can thus axially lock and unlock the shaft even when the latter is inaccessible from the outside of the casing. The integrated turbomachine can thus be assembled for instance on a module, such as a subsea module, and connected to the respective piping. Once the integrated turbomachine is connected to the piping, no access is available to the inner shaft. The axial locking device can be operated by the actuator for selectively locking and unlocking the shaft, e.g. in order to prevent or reduce damages to the bearings due to shocks caused for instance during transportation or installation of the turbomachine.

In subsea integrated turbomachines, such as typically subsea motor-compressor units, the turbomachine module can be placed on the seafloor with the shaft axially locked by the axial locking device. Damages to the bearings due to the impact of the module against the seafloor are thus prevented. Once the turbomachine module is correctly placed on the seafloor, the actuator can deactivate the axial locking device, allowing the turbomachine to start operation.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIGS. 2 and 3 illustrate an enlargement of the axial locking device arranged at the bottom end of the motor-compressor shaft, in an inactive and active condition, respectively.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the embodiments of the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

The terms "upper", "lower", "top", "bottom", "vertical", "horizontal" and the like as used herein are referred to the orientation of the motor-compressor unit when placed in the final position for operation.

In the following description the subject matter disclosed herein will be described with specific reference to embodiments involving a subsea motor-compressor unit provided with active magnetic bearings and landing bearings. It shall, however, be understood that the novel features disclosed herein can be applied with advantage also to other kinds of turbomachinery, specifically whenever protection of the bearings against shocks is desirable in situations where the rotation axis of the turbomachine is not accessible from the exterior of the casing, for instance in the case of integrated turbomachines.

Figure 1:
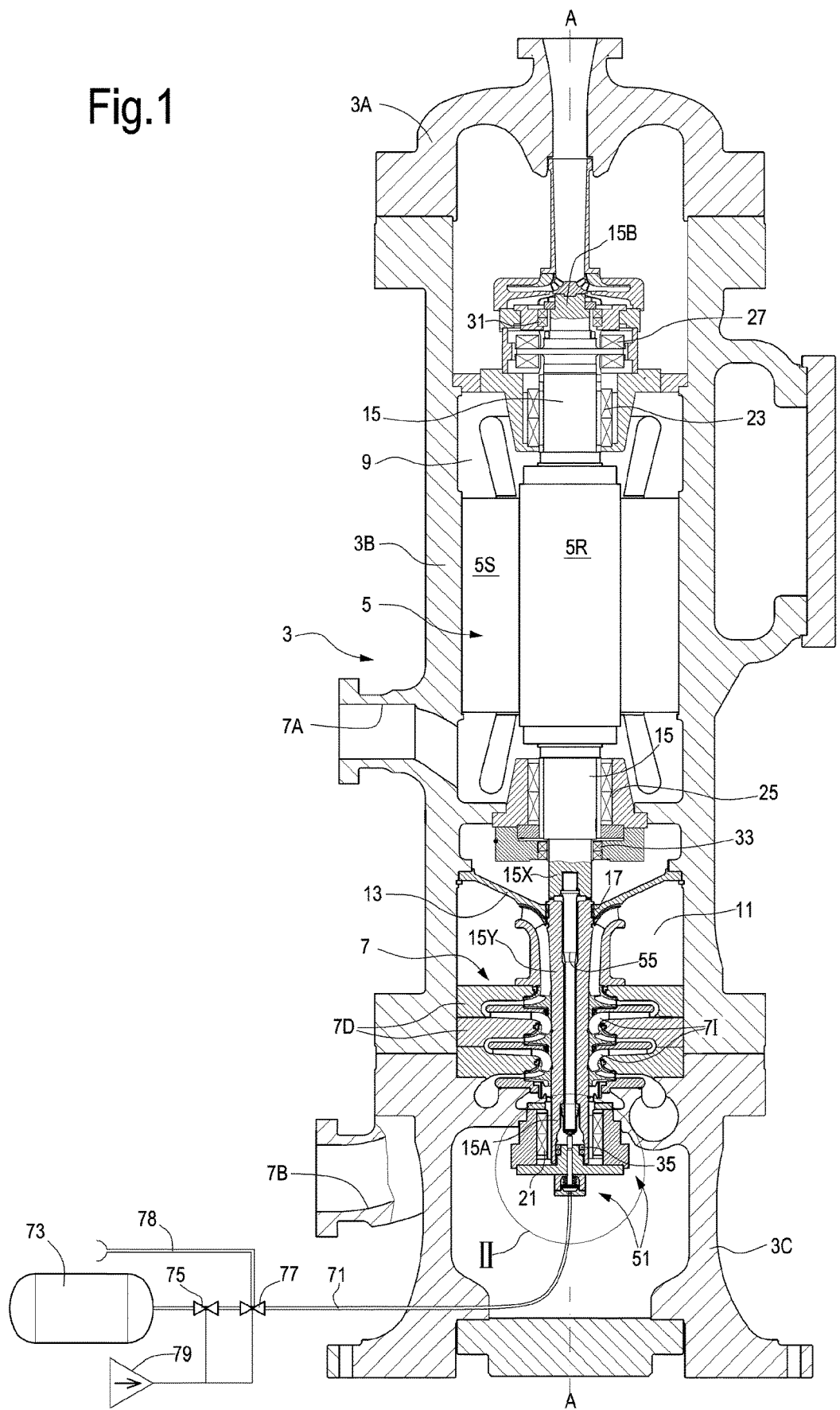
FIG. 1 illustrates a schematic sectional view of a motor-compressor unit.

Referring to FIG. 1, a motor-compressor unit 1 comprises a casing 3 housing an electric motor 5 and a driven turbomachine. In some exemplary embodiments the driven turbomachine comprises a gas compressor 7. The electric motor 5 can be housed in a motor compartment 9 formed within the casing 3. The compressor 7 can be housed in a compressor compartment 11 formed within the casing 3. Reference numbers 7A and 7B designate the compressor inlet and compressor outlet, respectively. In some embodiments the casing 3 can be formed of a plurality of casings or casing portions 3A, 3B, 3C. The casing portions can be sealingly connected to one another. In the exemplary embodiment illustrated in FIG. 1 the motor compartment 9 and the compressor compartment 11 are formed in an upper section of the casing 3 formed by casing portions 3A, 3B, 3C.

The motor compartment 9 and the compressor compartment 11 can be separated from one another by a separation wall 13. A shaft 15 rotating around a rotation axis A-A drivingly connects the electric motor 5 and the compressor 7, such that the compressor 7 can be driven into rotation by the electric motor 5. In the schematic of FIG. 1 the motor-compressor unit 1 is arranged with the shaft 15 oriented vertically and the compressor 7 placed underneath the electric motor 5. In other embodiments a different configuration or orientation of the motor-compressor unit 1 can be foreseen, for instance an arrangement with the compressor 7 arranged on top of the electric motor 5. In further embodiments, the shaft can be oriented horizontally rather than vertically.

The electric motor 5 can be comprised of a stator 5S, stationarily arranged in the casing 3, and a rotor 5R, mounted for rotation on the shaft 15. The compressor 7 can be comprised of diaphragms 7D, stationarily housed in the casing 3, and rotating impellers 71 mounted on the shaft 15 for rotation therewith.

The shaft 15 extends through the separation wall 13. In some embodiments a sealing arrangement 17 can be provided around the shaft 15 at the separation wall 13, to prevent or reduce process gas leakages from one compartment to the other and in particular from the compressor compartment to the motor compartment.

The shaft 15 is rotatingly supported in the casing 3 by means of a plurality of bearings. In some embodiments a first radial bearing 21 can be arranged at or near a first, lower end or bottom end 15A of the shaft 15. A second radial bearing 23 can be provided at or near a second, upper end or top end 15B of the shaft 15. A third, intermediate radial bearing 25 can be provided in an intermediate position along the shaft 15, e.g. between the electric motor 5 and the compressor 7. In some embodiments one or more axial bearings or thrust bearings can further be provided. In the exemplary embodiment of FIG. 1, an axial bearing or thrust bearing 27 is provided at or near the upper end 15B of shaft 15, adjacent the second radial bearing 23. A further or alternative axial bearing can be provided in an intermediate position between the electric motor 5 and compressor 7 and/or below the compressor 7, near the bottom end 15A of shaft 15. The bearings 21, 23, 25 and 27 can be active magnetic bearings.

If active magnetic bearings 21, 23, 25, 27 are used, the shaft can be further supported by landing bearings or auxiliary bearings, combined with the active magnetic bearings 21, 23, 25 and 27. The landing bearings support the shaft 15, as well as the rotor 5R and the impellers 71 of the compressor 7, when the active magnetic bearings become inoperative.

Figure 2:
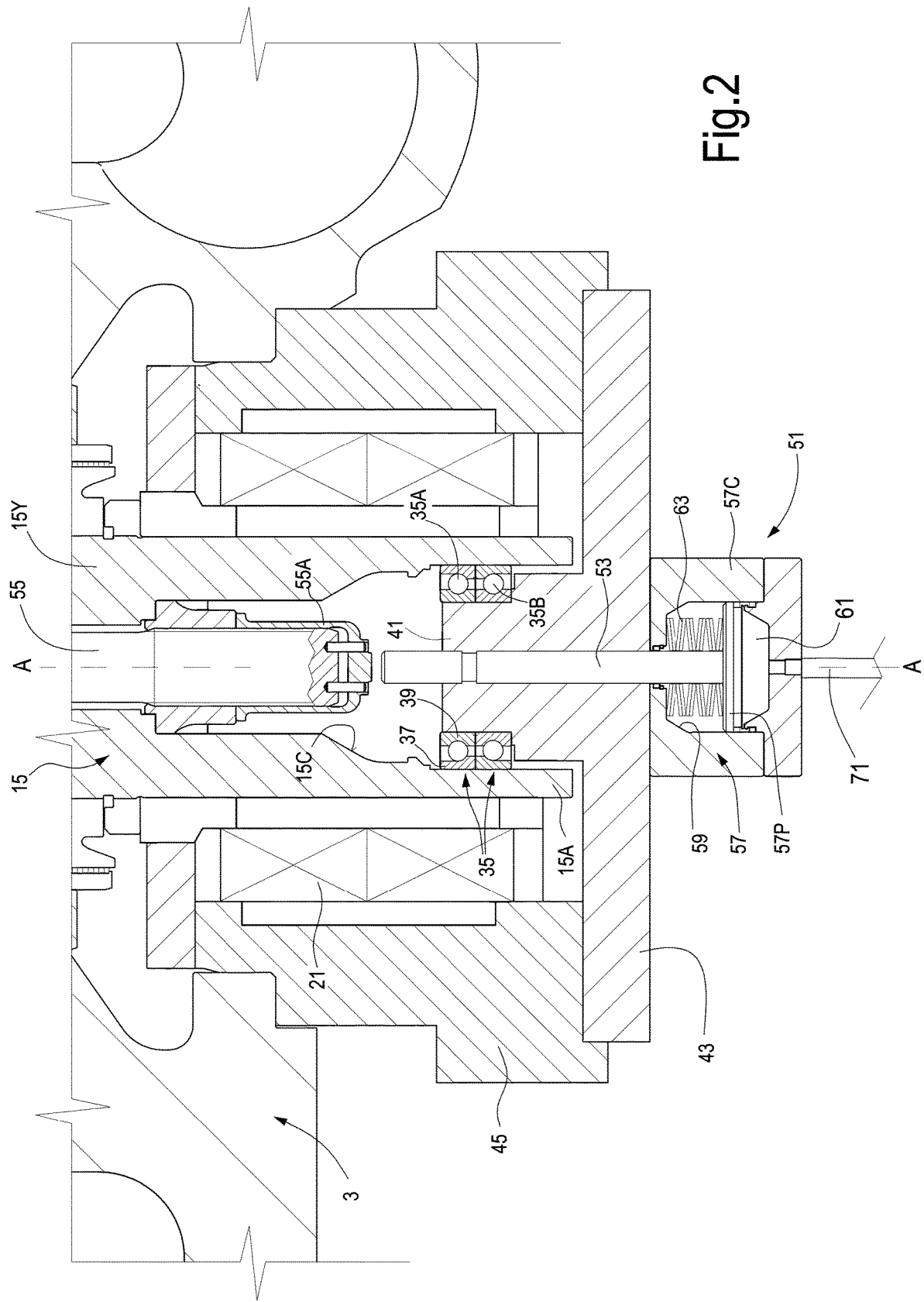

In the exemplary embodiment of FIG. 1, three landing bearing arrangements 31, 33, 35 are provided. A first landing bearing arrangement 31 is arranged at or near the upper end 15B of the shaft 15; a second landing bearing arrangement 33 is arranged in a position intermediate the electric motor 5 and the compressor 7, for instance adjacent the intermediate active magnetic bearing 25; and a third landing bearing arrangement 35 is located at or near the lower end 15A of shaft 15. Each landing bearing arrangement 31, 33, 35 can be comprised of two rolling bearings, e.g. two angular contact ball bearings, arranged in a face-to-face relationship, such as to accommodate combined loads, i.e. simultaneously acting radial and axial loads. FIGS. 2 and 3 show an enlargement of two ball bearings 35A, 35B of the landing bearing arrangement 35 at the bottom end 15A of shaft 15. Instead of angular contact ball bearings, other rolling bearings can be provided, which are capable of supporting both axial as well as radial loads.

In some embodiment the ball bearings 35A, 35B, or other landing or auxiliary bearings, are arranged in an axial cavity 15C provided at the bottom end 15A of shaft 15, see FIGS. 2 and 3. The outer races 37 of the ball bearings 35A, 35B are in contact with the side wall of the axial cavity 15C, while the inner races 39 are mounted on a pin 41, coaxial to shaft 15. The pin 41 can be mounted on, or integrally formed with a cover 43, which sealingly closes a seat 45 wherein the active magnetic bearing 21 are housed.

In order to prevent damages to the landing bearings while the motor-compressor unit 1 is installed on the seafloor, an axial locking device is provided at the bottom end 15A of shaft 15. The axial locking device is labeled 51 as a whole and is shown in detail in the enlargements of FIGS. 2 and 3 in an inoperative and operative condition, respectively. In some embodiments the axial locking device 51 can be housed in a bottom portion 3C of the casing 3.

The axial locking device 51 can comprise a pusher 53 configured and arranged for applying an axial, upwardly oriented thrust F against the shaft 15. In some embodiments the pusher 53 can comprise a spindle substantially coaxial to shaft 15 and arranged in a face-to-face relationship with the terminal bottom end 55A of a tie rod 55 forming part of shaft 15 and connecting two shaft portions 15X, 15Y to one another.

The pusher 53 can be acted upon by an actuator member. In some embodiments the actuator member can comprise a single-acting cylinder-piston 57. The cylinder-piston 57 can comprise a cylinder 57C and a piston 57P slidingly arranged in the cylinder 57C. The piston 57P divides the interior of the cylinder 57C into a first chamber 59 and a second chamber 61. The first chamber 59 can house a resilient member, for instance a stack of Belleville springs 63. The second chamber 61 can be filled with a pressurized fluid, more particularly a compressible fluid, e.g. a gas or a liquid having some degree of compressibility. In some embodiments an inert gas, such as nitrogen, can be used to fill the second chamber 61.

The pusher 53 is constrained to the piston 57P and extends through the cover 43 and the pin 41.

As can be appreciated from FIGS. 2 and 3, the piston 57P can slide in the cylinder 57C between an upper, active position (FIG. 3) and a lower, inactive position (FIG. 2). The piston 57P is biased towards the lower, inactive position by the Belleville springs 63 or other resilient members, and can be lifted against the force of the springs 63 by increasing the fluid pressure in the bottom chamber 61. In the lower, inactive position (FIG. 2) the pusher 53 is distanced from the shaft 15 and does not co-act therewith. In the upper, active position (FIG. 3) the pusher 53 is pushed against the lower end 15A of shaft 15 and more specifically against the bottom end of the inner tie rod 55, which holds together the shaft portions 15X, 15Y. The axial thrust F applied by the pusher 53 against the shaft 15 depends upon the fluid pressure in chamber 61 and the area of the surface of the piston 57P facing the chamber 61. In some embodiments, and for the purposes set forth herein after, the fluid pressure in the chamber 61 can be such that the spindle of pusher 53 generates a lifting force F on the shaft 15, which is approximately twice the weight of the shaft and relevant rotating components mounted thereon, i.e. the rotor 5R and the compressor impellers 71.

Pressurized fluid can be delivered in the bottom chamber 61 through a pressurized fluid duct 71. In some embodiments, the pressurized fluid duct 71 can be fluidly coupled to a pressurized fluid tank 73 (FIG. 1). A controlled valve arrangement can be provided along the pressurized fluid duct 71, such that the chamber 61 can be filled with pressurized fluid, and fluid can be discharged from the chamber 61, according to needs. In some embodiments a check valve or a pressure reduction valve 75 and a three-way valve 77 can be sequentially arranged along the pressurized fluid duct 71. Reference number 79 schematically indicates a valve control device. In other embodiments, only a three-way valve 77 can be provided. The three-way valve 77 can be controlled such as to allow pressurized fluid to flow from the pressurized fluid tank 73 to the chamber 61, or from the chamber 61 in a discharging line 78.

In some embodiments, the volume of the pressurized fluid tank 73 and the fluid pressure therein can be such as to maintain the desired fluid pressure in the chamber 61 for a given period of time, even in the presence of fluid leakages. The valves 75, 77 can be controlled such as to maintain in chamber 61 at a substantially constant fluid pressure, lower than the pressure in tank 73, and to discharge the pressurized fluid from the chamber 61 when required.

Using a compressible fluid in combination with a pressurized fluid tank, the pressure in the chamber 61 can be maintained constant for a relatively long period of time even in presence of some fluid leakage from the pressurized fluid duct 71 and/or from the chamber 61.

With the above described axial locking device 51 the rotating components of the motor-compressor unit 1, i.e. the rotor 5R of the electric motor 5, the impellers 71 of the compressor 7 and the shaft 15, can be locked in an axial position with an upwardly oriented locking force F (FIG. 3), which can be e.g. approximately twice the weight of the rotating components, said force being generated by the pressurized fluid in chamber 61. The locking force F is maintained for the time required until the motor-compressor unit 1 has been installed on the seafloor. In this way any shock on the casing 3 of the motor-compressor unit 1, which can be caused by landing of the motor-compressor unit 1, or the module whereon the motor-compressor unit 1 is mounted, on the seafloor is not transmitted to the auxiliary or landing bearing arrangements 31, 33, 35. If compressible fluid is used to pressurize the chamber 61, an additional shock damping effect is ensured.

When the motor-compressor unit 1 has reached its final position on the seafloor, the shaft 15 can be axially unlocked so that operation of the motor-compressor unit 1 can start. Unlocking is obtained by venting the pressurized fluid from the chamber 61. The pressurized fluid can be vented in the sea through valve 77, for example, if the nature of the pressurized fluid so permits, e.g. if nitrogen or other inert gas is used. Alternatively, the pressurized fluid can be collected in a separate collecting tank at a pressure lower than the pressure of chamber 61.

The Belleville springs 63 or any other suitable resilient device acting upon piston 57P in a direction opposite the direction of the force generated by the fluid pressure in chamber 61, will immediately unlock the device 51, pushing the piston 57P and the spindle of the pusher 53 away from the shaft 15 as soon as a venting valve, e.g. valve 77, is opened and the chamber 61 is placed in fluid communication with the environment or with a low-pressure tank.

If the motor-compressor unit 1 shall be recovered from the seafloor, the axial locking device 51 can be activated again, by fluidly coupling the chamber 61 with the pressurized fluid tank 73 through valves 75, 77 and thus pressurizing the chamber 61 again.

Using a pressurized fluid and a cylinder-piston actuator to activate the axial locking device has several advantages, including easy control and maintenance, as well as low cost and high reliability of the device. Use of a compressible fluid has additional advantages in terms of reliability of the axial locking device, since a compressible fluid ensures operability of the axial locking device also in case of fluid leakages, for instance if a suitable pressurized fluid tank is combined with the axial locking device. Sufficient pressure and thus sufficient axial thrust can be maintained onto the shaft of the motor-compressor unit 1 for a period of time, thanks to the volume of the pressurized fluid tank and the compressibility of the fluid.

In other embodiments, different actuators can be used instead of a fluid-actuated cylinder-piston device. For example an electrically powered jack can be used.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An integrated turbomachine comprising:
a casing;
an electric motor housed in the casing;
a driven turbomachine component housed in the casing;
a rotating shaft drivingly connecting the electric motor and the driven turbomachine component, the rotating shaft housed in the casing and having a longitudinal rotation axis (A-A);
at least one thrust bearing and at least one radial bearing rotatingly supporting the rotating shaft; and
an axial locking device housed inside the casing, arranged and configured for applying a thrust to the rotating shaft, parallel to the longitudinal rotation axis (A-A) of the rotating shaft, and comprised of an actuator member, configured to selectively activate and/or deactivate the axial locking device,
wherein the actuator member comprises a cylinder-piston actuator operated by a pressurized fluid.

2. The integrated turbomachine of claim 1, wherein the axial locking device comprises a pusher controlled by the actuator member, the pusher being substantially co-axial to the rotating shaft.

3. The integrated turbomachine of claim 1, wherein the actuator member is arranged inside the casing and is controlled from an exterior of the casing.

4. The integrated turbomachine of claim 1, wherein the at least one radial bearing is arranged at or near an end of the rotating shaft.

5. The integrated turbomachine of claim 1, wherein the at least one thrust bearing is arranged at or near an end of the rotating shaft.

6. The integrated turbomachine of claim 1, wherein the at least one thrust bearing comprises an active magnetic bearing.

7. The integrated turbomachine of claim 1, wherein the at least one radial bearing comprises an active magnetic bearing.

8. The integrated turbomachine of claim 1, further comprising at least one landing bearing arrangement.

9. The integrated turbomachine of claim 1, further comprising at least a second radial bearing.

10. The integrated turbomachine of claim 9, wherein the at least a second radial bearing is an active magnetic bearing.

11. The integrated turbomachine of claim 1, wherein the cylinder-piston actuator is a single-effect cylinder-piston actuator.

12. The integrated turbomachine of claim 1, wherein the cylinder-piston actuator comprises a cylinder and a piston slidingly housed in the cylinder and dividing the cylinder into a first chamber and a second chamber, the first chamber housing a resilient member biasing the piston in a direction away from the rotating shaft of the integrated turbomachine and the second chamber containing the pressurized fluid.

13. The integrated turbomachine of claim 12, wherein the pressurized fluid is a compressible fluid.

14. The integrated turbomachine of claim 11, further comprising a pressurized fluid tank fluidly coupled to the cylinder-piston actuator and arranged outside the casing, and at least one duct fluidly connecting the pressurized fluid tank to the cylinder-piston actuator, the at least one duct extending through the casing.

15. The integrated turbomachine of claim 1 configured as a vertical axis turbomachine, and wherein the axial locking device is arranged at a bottom end of the rotating shaft.

16. The integrated turbomachine of claim 1, wherein the driven turbomachine component comprises a centrifugal compressor.

17. The integrated turbomachine of claim 1 configured as a subsea motor-compressor unit.

18. A method of handling an integrated turbomachine, the integrated turbomachine comprising an electric motor, a driven turbomachine component and a shaft drivingly connecting the electric motor and the driven turbomachine component, the electric motor, the driven turbomachine component and the shaft being housed in a casing the method comprising:

activating an axial locking device to axially lock the shaft in the casing, the axial locking device housed inside the casing and comprising a cylinder-piston actuator operated by a pressurized fluid and configured to selectively activate and/or deactivate the axial locking device;

moving the integrated turbomachine from a first position to a second position; and deactivating the axial locking device.

19. A method for installing a subsea motor-compressor unit on a seafloor, the subsea motor-compressor unit comprising bearings rotatingly supporting a shaft in a casing, the method comprising:

arranging an axial locking device at a bottom end of the shaft;

applying an upwardly oriented thrust against the shaft using said axial locking device;

placing the subsea motor-compressor unit on the seafloor; and de-activating the axial locking device.

* * * * *